(12) United States Patent
Washi et al.

(10) Patent No.: US 12,459,425 B2
(45) Date of Patent: Nov. 4, 2025

(54) PROJECTION DEVICE FOR VEHICLE, METHOD OF OPERATING SAME, AND LIGHT FIXTURE FOR VEHICLE

(71) Applicant: Ichikoh Industries, Ltd., Isehara (JP)

(72) Inventors: Yuichiro Washi, Isehara (JP); Hideto Kurimoto, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 221 days.

(21) Appl. No.: 18/564,023

(22) PCT Filed: May 16, 2022

(86) PCT No.: PCT/JP2022/020356
§ 371 (c)(1),
(2) Date: Nov. 24, 2023

(87) PCT Pub. No.: WO2022/249912
PCT Pub. Date: Dec. 1, 2022

(65) Prior Publication Data
US 2024/0253558 A1     Aug. 1, 2024

(30) Foreign Application Priority Data

May 27, 2021   (JP) .................................. 2021-089595

(51) Int. Cl.
*B60Q 1/34* (2006.01)
*B60Q 1/46* (2006.01)
(Continued)

(52) U.S. Cl.
CPC .................. *B60Q 1/34* (2013.01); *B60Q 1/46* (2013.01); *F21S 41/265* (2018.01); *F21S 41/40* (2018.01);
(Continued)

(58) Field of Classification Search
CPC ........ B60Q 1/34; B60Q 1/46; B60Q 2400/50; B60Q 2900/40; B60Q 1/381;
(Continued)

(56) References Cited

U.S. PATENT DOCUMENTS

2005/0117364 A1 * 6/2005 Rennick ................. B60Q 9/008
362/540
2013/0335212 A1 * 12/2013 Purks ....................... B60Q 1/34
340/465

(Continued)

FOREIGN PATENT DOCUMENTS

JP   2010211404 A * 9/2010 ............. B60Q 1/085
JP   2016-49891 A   4/2016
(Continued)

OTHER PUBLICATIONS

International Search Report issued Jun. 28, 2022 in PCT/JP2022/020356 filed on May 16, 2022, 2 pages.
(Continued)

*Primary Examiner* — Abdullah A Riyami
*Assistant Examiner* — Syed M Kaiser
(74) *Attorney, Agent, or Firm* — Oblon, McClelland, Maier & Neustadt, L.L.P.

(57) ABSTRACT

The present invention addresses the problem that the road surface area allowed for projecting an image is limited, there is a restriction on the number of parts into which the image can be divided, and it is hard to achieve an intended visual effect even if individual images are sequentially projected. A control unit (31) controls three light sources (21a to 21c) so that, among three individual images (5a to 5c), projection of an image (5b) to be projected second is started at a time point (t4) later than a time point (t3) at which a period of 250/3 milliseconds has elapsed from a projection start time point (t1) for an image (5a) to be projected first. Consequently, the (Continued)

visual effect of sequential projection of individual images is more easily achieved than when the projection of the second individual image (5b) is started at the time (t3).

15 Claims, 7 Drawing Sheets

(51) Int. Cl.
*F21S 41/265* (2018.01)
*F21S 41/40* (2018.01)
*F21S 43/20* (2018.01)
*H05B 47/16* (2020.01)

(52) U.S. Cl.
CPC ........ *F21S 43/26421* (2024.05); *H05B 47/16* (2020.01)

(58) Field of Classification Search
CPC .... F21S 41/265; F21S 41/40; F21S 43/26421; H05B 47/16; H05B 47/155; H05B 45/10
See application file for complete search history.

(56) References Cited

U.S. PATENT DOCUMENTS

| | | | |
|---|---|---|---|
| 2015/0158416 A1* | 6/2015 | Lee | F21S 43/15 315/77 |
| 2019/0322209 A1 | 10/2019 | Sugiyama et al. | |
| 2020/0114812 A1 | 4/2020 | Imaishi et al. | |
| 2020/0207261 A1* | 7/2020 | Camras | B60Q 1/2696 |
| 2021/0178960 A1* | 6/2021 | Fenske | G01S 17/931 |
| 2021/0254806 A1* | 8/2021 | Choi | B60Q 1/28 |

FOREIGN PATENT DOCUMENTS

| | | | |
|---|---|---|---|
| JP | 2016-193689 A | 11/2016 | |
| JP | 2020-17488 A | 1/2020 | |
| KR | 20210019925 A | * 2/2021 | ............. H04N 23/90 |

OTHER PUBLICATIONS

Extended European Search Report issued Feb. 11, 2025, in corresponding European Patent Application No. 22811185.2 citing documents 1 and 2 therein, 9 pages.

* cited by examiner (a)

(b)

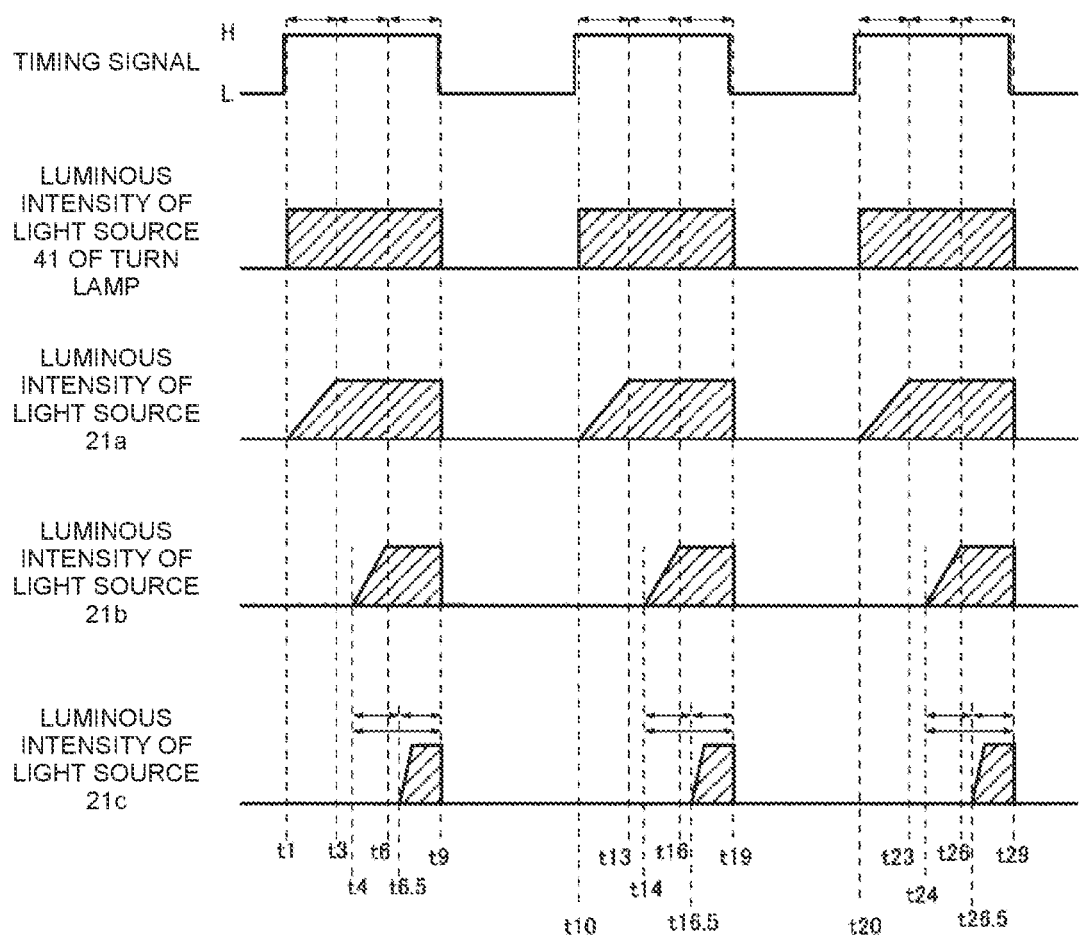

PROJECTION DEVICE FOR VEHICLE, METHOD OF OPERATING SAME, AND LIGHT FIXTURE FOR VEHICLE

TECHNICAL FIELD

The present disclosure relates to a projection device for a vehicle, an operation method thereof, and a lighting device for a vehicle.

BACKGROUND ART

A technique has been developed in which a pattern (for example, an arrow) indicating the traveling direction of a vehicle is projected onto a road surface to alert pedestrians and drivers around the vehicle to their attention. For example, when the subject vehicle turns left or the lane changes to the left lane, an arrow pointing obliquely forward to the left is projected on the road surface on the front left side of the subject vehicle so as to alert pedestrians and drivers around the subject vehicle. The present invention is particularly effective when the blinking of the turn lamp of the vehicle is difficult to be visually recognized by surrounding pedestrians and drivers due to surrounding traffic conditions or structures (such as walls along the road).

Patent Document 1 discloses a technique in which drawing of a marker indicating the traveling direction of a vehicle on a road surface is started when a turn signal lamp is turned on, and drawing of the marker is ended when the turn signal lamp is turned off. Patent Document 2 discloses an apparatus for projecting an image on a road surface using a shade provided with an opening shaped corresponding to an arrow (see paragraph 0044 of the same document).

CITATION LIST

Patent Literature

Patent Literature 1: JP 2016-193689 A
Patent Literature 2: JP 2020-17488 A

SUMMARY OF THE INVENTION

Problems to be Solved by the Invention

When an image indicating the direction of travel of the vehicle is projected on the road surface, it is expected that attention will be called more effectively by projecting a divided image sequentially (that is, starting projection of a plurality of individual images sequentially at different points in time) instead of projecting a certain image at one time. However, there is a restriction on the number of image divisions (i.e., the number of individual images) due to the limited road surface area allowed for the projection of the whole image, and there is a concern that it is difficult to obtain an intended visual effect (for example, a visual effect in which the individual images appear to flow) even if the individual images are sequentially projected onto the road surface. As described above, the present inventors have found a new problem of making it easy to obtain a visual effect by projecting sequential individual images even when the number of individual images is limited. It should be noted that the number of image divisions and the number of individual images are also limited in terms of cost and/or size of the projection apparatus.

Means for Solving the Problem

The projection apparatus according to an embodiment of the present disclosure comprises:

a projection unit which has at least M (M represents a natural number of 2 or more) light sources and projects at least N (N represents a natural number of 2 or more) individual images onto a road surface along a predetermined direction based on the lighting of the at least M light sources; and a control unit which controls the at least M light sources so that, in a predetermined period of at least P milliseconds (where P represents a real number of 200 or more), the projection of the at least N individual images onto the road surface starts in a predetermined order from a start point of the predetermined period, all of the at least N individual images are projected onto the road surface at an intermediate point of the predetermined period, and the projection of the at least N individual images onto the road surface ends at an end point of the predetermined period. The control units controls the at least M light sources so that the projection of the second projected image in the at least N individual images is started at a second time point after a first time point in which a period of P/N milliseconds has elapsed from a projection start time point of the first projected image in the at least N individual images.

In some embodiments, the N is a natural number of 3 or 4 or 5, and the P represents a real number within the range of 250 to 500. The period during which the first projected image is projected alone may be in the range of 35%-60% of P milliseconds. Additionally or alternatively, the second time point may be a time point closer to the first time point than the third time point when a period of 2×(P/N) milliseconds has elapsed from the first time point. Additionally or alternatively, the second time point may be within a range of 5 to 70 milliseconds from the first time point. Additionally or alternatively, the second time point may be a time point within a range of 1.5×(P/(N+1)) milliseconds to 2×(P/(N+1)) milliseconds. It is preferable that (Q/P)≤0.8 is satisfied when the time interval from the start point to the intermediate point of the predetermined period is Q (Q is a real number) milliseconds.

In some embodiments, the natural number denoted by M is equal to the natural number denoted by N, and the time at which projection of the N individual images onto the road surface begins differs for all of the N individual images.

In some embodiments, the controller is configured to control at least M light sources to repeat a projection period in which at least M light sources are controlled for projection of at least N discrete images onto the road surface and a non-projection period in which all of the at least M light sources are turned off, in response to a timing signal transmitted from the vehicle body. The predetermined is equal to the projection period.

In some embodiments, the projection unit includes a first lens having at least M lens portions corresponding to at least M light sources, a second lens for projecting the emitted light of the at least M light sources, and a pattern forming member provided between the first lens and the second lens and having at least M light transmitting sections corresponding to the at least M light sources in a light-shielding portion.

A method of operating a projection device for a vehicle according to another embodiment of the present disclosure is a method of operating a projection device for a vehicle having a projection unit having at least M (where M represents a natural number of 2 or more) light sources and projecting at least N (where N represents a natural number of 2 or more) individual images onto a road surface in a predetermined direction based on the lighting of the at least M light sources and a control unit controlling the at least M light sources so that during a predetermined period of at least P (where P represents a real number of 200 or more) milliseconds, the projection of the at least N individual images onto the road surface is started in a predetermined order from the start point of the predetermined period, all of the at least N individual images are projected onto the road surface at an intermediate point of the predetermined period, and the projection of the at least N individual images onto the road surface is completed at the end point of the predetermined period, wherein
the projection of the first projected image in the at least N individual images is started, and
the projection of the second projected image in the at least N individual images is started at a second point of time after a first point of time in which a period of P/N milliseconds has elapsed from the projection start point of the first image is completed.

Effect of the Invention

According to an aspect of the present disclosure, even when the number of individual images is limited, it is possible to easily obtain a visual effect by projecting the individual images sequentially.

Individual images are started to be projected sequentially, and all individual images (the whole image) are finally projected on the road surface.

Figure 9:
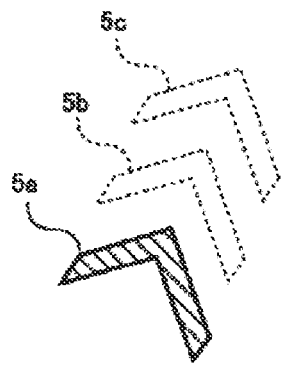
Figure 9:
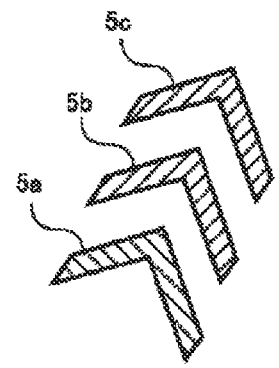

In FIG. 9, projection of individual images is started sequentially in the order of (a) and (b), and the entire image is finally projected.

Projected onto the road surface.

Figure 10:
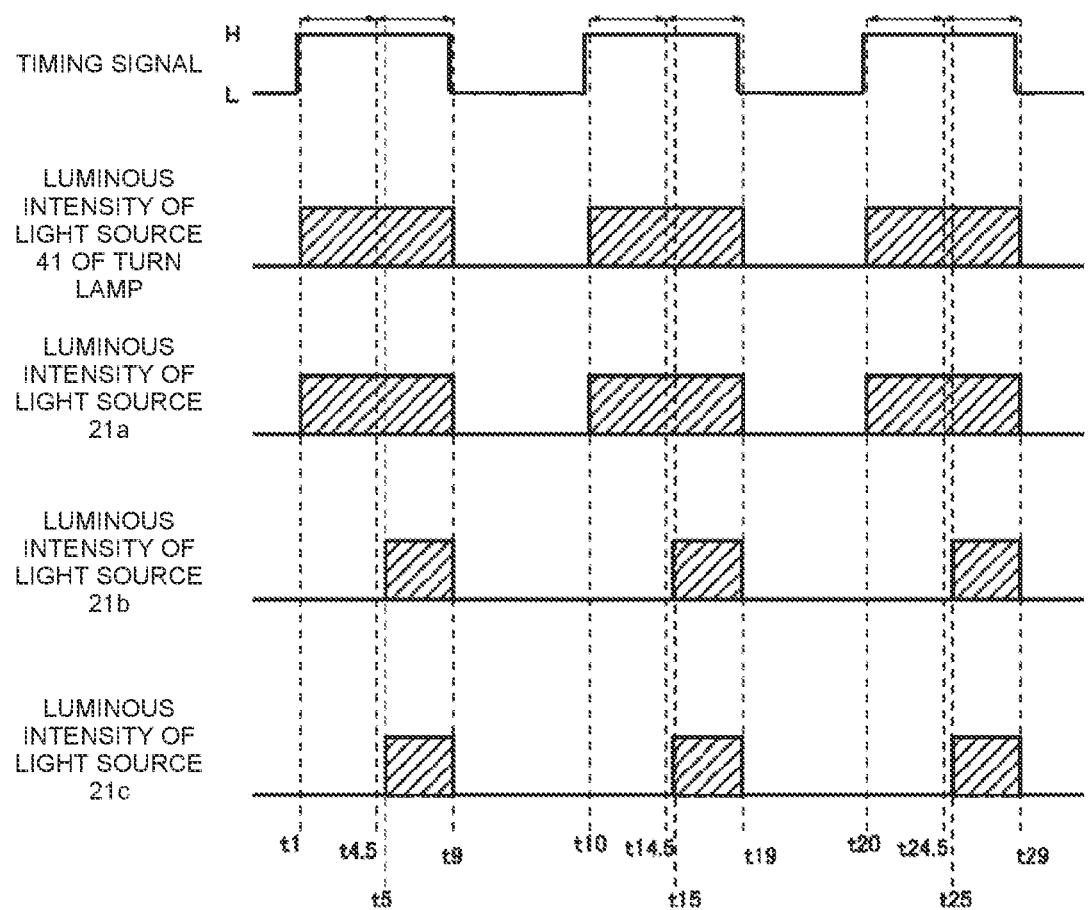

FIG. 10 is a schematic time chart for the case of FIG. 9.

FIG. 11 is a time chart for a case where each light source is controlled to be turned on by a PWM signal.

MODE FOR CARRYING OUT THE INVENTION

Non-limiting embodiments and features of the present invention will now be described with reference to the drawings. Those skilled in the art can combine the embodiments and/or features without over description, and the synergistic effects of this combination can be understood. Overlapping description among the embodiments is omitted in principle. The reference drawings are primarily intended to describe the invention and have been simplified for the convenience of drawing. Each feature is understood as a universal feature that is not only valid for the vehicle projection device disclosed herein, but also applies to various other vehicle projection devices not disclosed herein.

In this specification, the front-rear direction, the left-right direction, and the up-down direction are understood with reference to the vehicle 1. The inside direction of the vehicle is an arbitrary direction from the outside of the vehicle toward the inside of the vehicle. The outside direction of the vehicle is an arbitrary direction from the inside of the vehicle toward the outside of the vehicle. The up-down direction coincides with the vertical direction or extends along the vertical direction. The inside and outside of the vehicle may be included in any plane that intersects or is perpendicular to the vertical direction.

Figure 1:
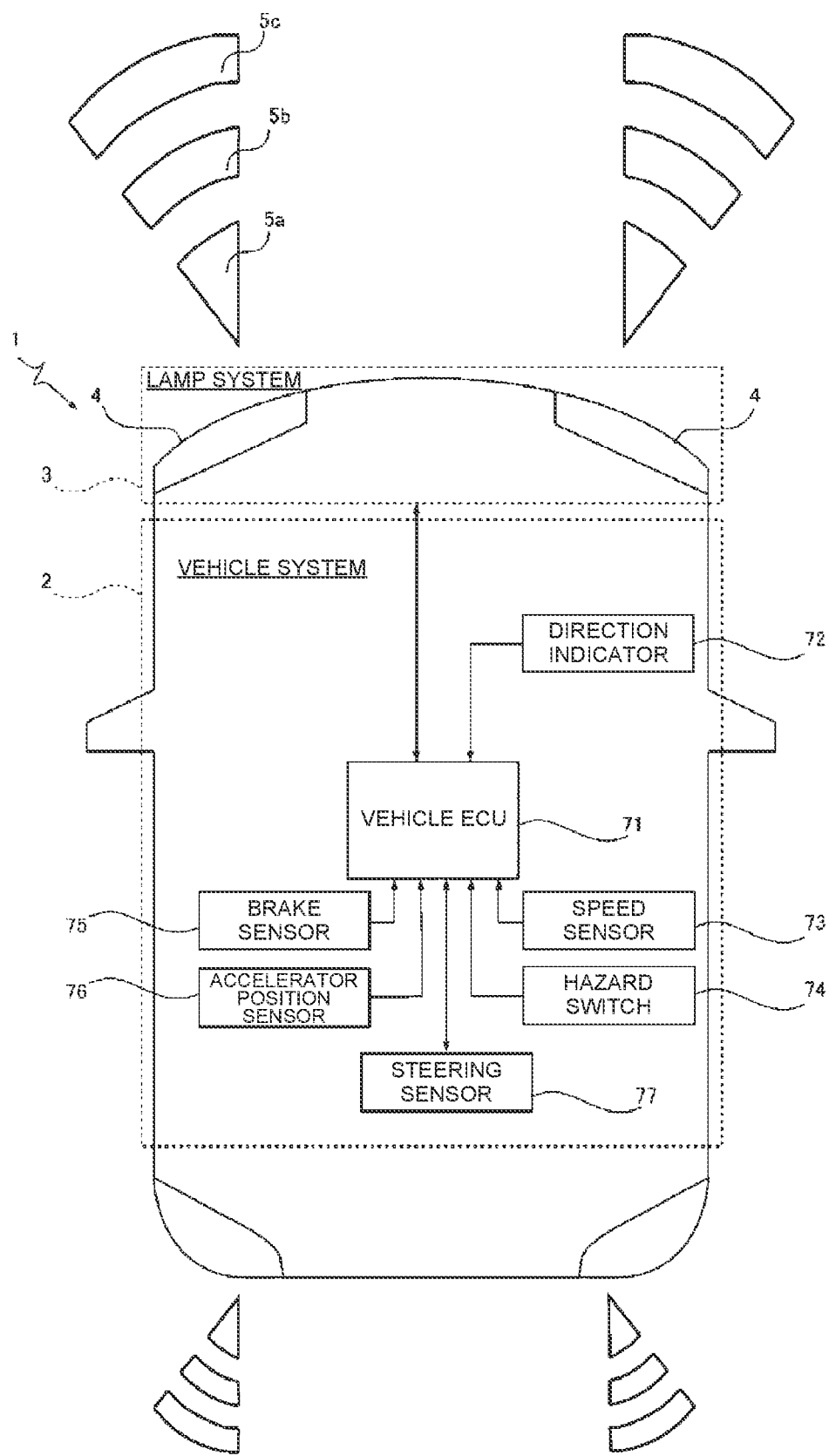
FIG. 1 is a schematic diagram showing a system configuration of a vehicle according to an aspect of the present disclosure.

The vehicle 1 is a self-propelled movable body of two, three, or four wheels, and is driven by power generated by an internal combustion engine or an electric motor. A vehicle 1 is configured by attaching a vehicle lamp to a vehicle body, and each includes an independent vehicle and lamp system (2, 3). The vehicle system 2 is configured by connecting individual elements via an in-vehicle network. In FIG. 1, for convenience of explanation, some elements (a vehicle ECU (Electronic Control Unit) 71, a direction indicator 72, a speed sensor 73, a hazard switch 74, a brake sensor 75, an accelerator position sensor 76, and a steering sensor 77) included in the vehicle system 2 are shown.

The vehicle ECU 71 may be composed of one or more sub-ECUs. The direction indicator 72 is operated. by voice of a hand or by a hand or a foot or the like to generate a turn signal. The hazard switch 74 is operated by the driver to generate a hazard signal. These turn signals and hazard signals are transmitted to the lighting system 3 via or without the vehicle ECU 71. It should be noted that the turn signal and the hazard signal are timing signals in which pulses are generated at a constant cycle, and are collectively referred to as timing signals without distinguishing between them.

Figure 2:
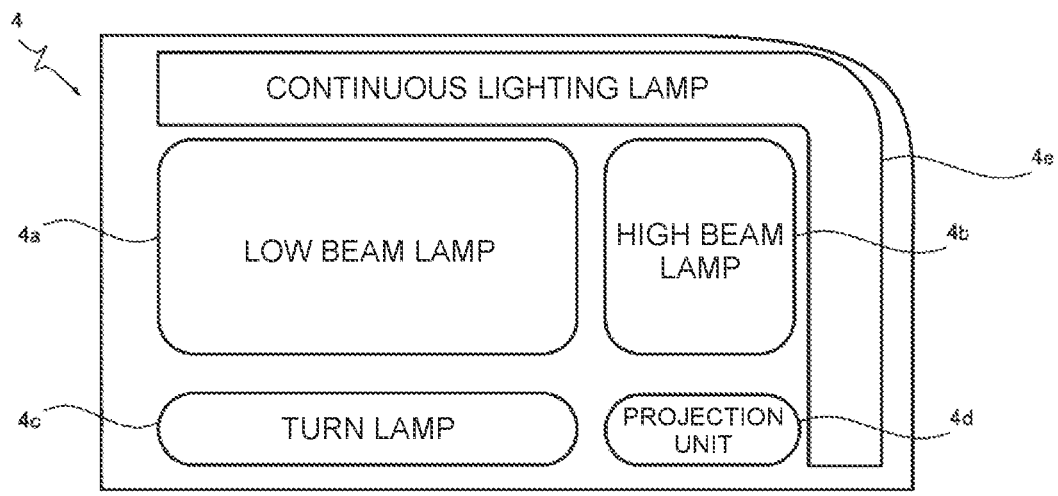
FIG. 2 is a schematic diagram showing a schematic configuration of a front lamp according to an embodiment of the present disclosure.

The lamp system 3 includes left and right front lamps (vehicle lamps) 4 for illuminating the front in the traveling direction of the vehicle. For example, as shown in FIG. 2, each front lamp 4 includes a low beam lamp 4a, a high beam lamp 4b, a turn lamp 4c, a projection unit 4d, and a continuous lighting lamp 4e. These are installed in a common lamp chamber. The constant lighting lamp 4e is a daytime running lamp and/or a clearance lamp. The light chamber is defined by mounting an outer lens on the concave housing. A projection device for sequentially projecting individual images 5a-5c onto a road surface comprises a projection unit 4d of a front lamp 4 and a control unit 31.

The turn lamp 4c is supplied from the vehicle body such as a turn signal and a hazard signal. For example, lighting is started in response to a change (for example, rising) of the pulse signal, and lighting is turned off in response to a change (for example, falling) of the pulse signal. The turn lamp 4c includes an LED (Light Emitting Diode) and an LD (Laser Diode) as a light source. Although one or more semiconductor light-emitting elements described above may be included, the present invention is not limited thereto, and a halogen lamp, an incandescent lamp, or the like may be employed. The turn lamp 4c may be of a sequential type, but is not limited thereto.

The projection unit 4d starts the projection of the individual image onto the road surface in synchronization with the first change (for example, rising) of the timing signal such as a turn signal and a hazard signal supplied from the vehicle body and stops the projection of the certain image onto the road surface in synchronization with the second change (for example, falling) of the timing signal (this point will be described later with reference to FIG. 7).

The projection unit 4d has at least M light sources, and projects at least N individual images onto the road surface along a predetermined direction based on the lighting of the at least M light sources. M denotes a natural number of 2 or more. Similarly, N represents a natural number of 2 or more. In some cases (see, for example, FIGS. 3-5), M=N=3, and the projection unit 4d has three light sources 21a-21c, and projects three individual images 5a-5c onto the road surface along a predetermined direction (e.g., along the outside direction of the vehicle intersecting in the vertical direction) based on the lighting of the three light sources 21a-21c (see FIG. 3). The light source 21 includes one or more or two or more semiconductor light-emitting elements such as an LED (Light Emitting Diode) and an LD (Laser Diode), although not necessarily limited thereto. The light sources 21a-21c may be mounted on the substrate 22 and thermally connected to a heat sink (not shown).

Figure 3:
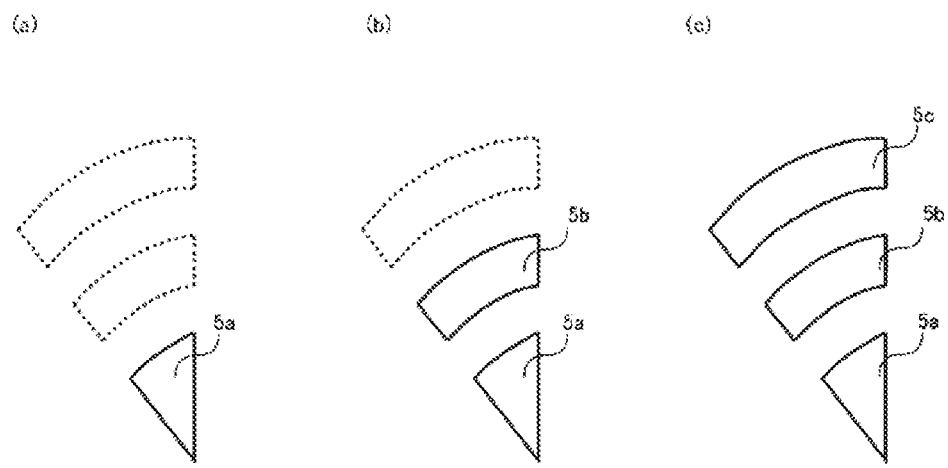
FIG. 3 is a schematic diagram showing a projection procedure in which projection of individual images is started sequentially in the order of (a) to (c) and all individual images (whole image) are finally projected onto a road surface.
Figure 4:
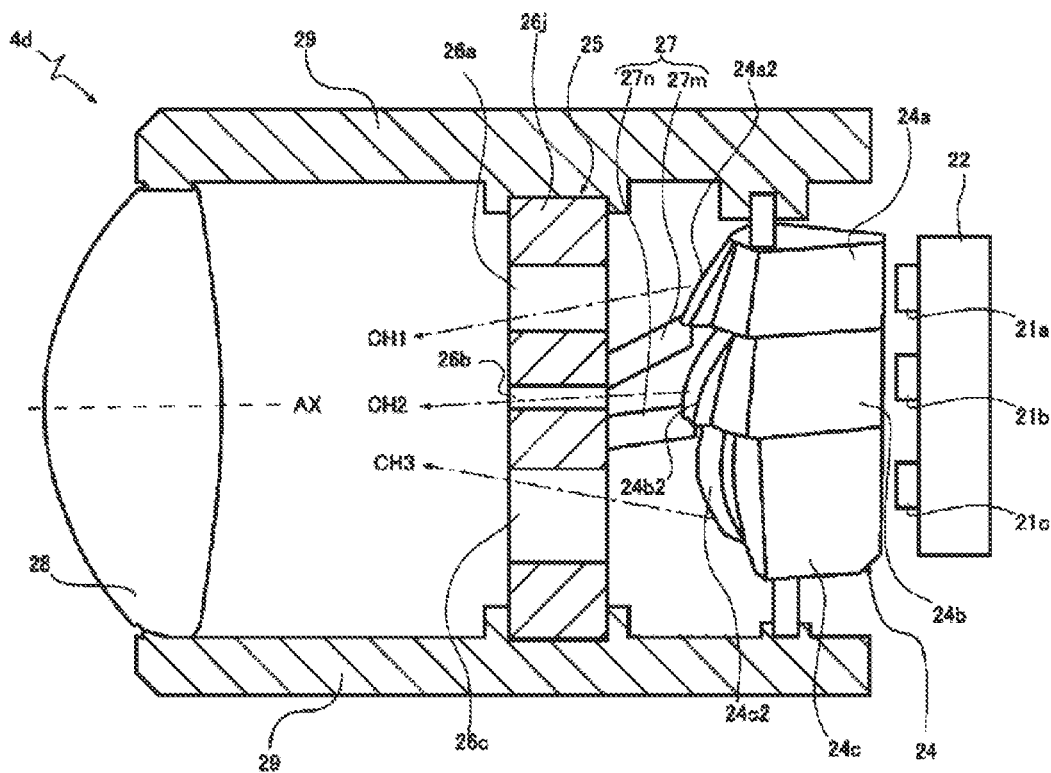
FIG. 4 is a schematic diagram showing a schematic configuration of a projection unit of a projection apparatus according to an embodiment of the present disclosure.
Figure 5:
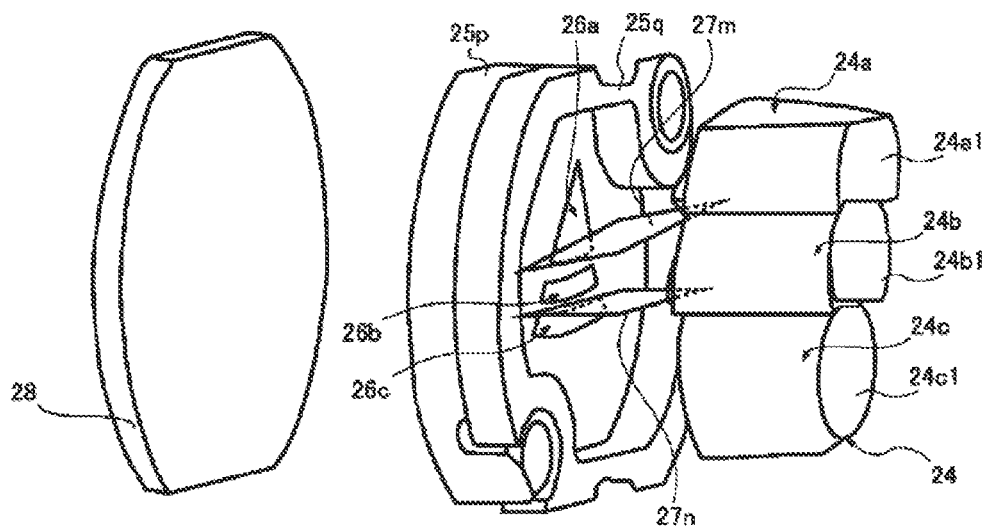
FIG. 5 is a schematic perspective view showing an arrangement relationship among a condenser lens, a pattern forming member, and a projection lens in a projection unit of the projection apparatus shown in FIG. 4.

In FIGS. 3 to 5, M=N=3, but it should not be limited to this. The case of M=N=4 and the case of M=N=5 can be understood similarly. In consideration of the pulse duration (i.e., H-level period) of timing signals such as turn signals and hazard signals supplied from the vehicle body, it is desirable that M and N represent natural numbers of 5 or less, but this is not necessarily the case. A form in which M and N represent different natural numbers is also assumed (for example, M=3 and N=2 can be set).

The projection unit 4d of the front lamp 4 need not be disposed adjacent to the turn lamp 4c as shown in FIG. 2. For example, the projection unit 4d may be provided outside the front lamp (for example, a side mirror). As for the low beam lamp 4a, the high beam lamp 4b, and the continuous lighting lamp 4e, well-known ones in this field can be adopted, and detailed description thereof is omitted.

As shown in FIG. 3, when three individual images 5a to 5c are sequentially projected onto the road surface from the projection unit 4d of the front lamp on the left side, the intention of the driver of the vehicle 1 to turn left or change the lane to the left side is presented to surrounding drivers and pedestrians. First, as shown in FIG. 3 (a), only the individual image 5a is projected, then as shown in FIG. 3 (b), the projection of the individual image 5b is started, and finally as shown in FIG. 3 (c), the projection of the individual image 5c is started, and finally all the individual images 5a to 5c are projected onto the road surface. The case where the number of individual images is four or five is also understood in the same manner.

As will be understood from the description below, the projection of the second projected individual image 5b is started at a second time point after the first time point at which a period of 250/3 milliseconds has elapsed from the projection start time point of the first projected individual image 5a in the three individual images 5a to 5c. This makes it easier to obtain a visual effect by projecting a sequential individual image than when the projection of the second individual image is started at the first time point. Specifically, although the number of individual images is small, the individual images 5a to 5c can be shown to an observer (a pedestrian or a driver around the own vehicle) so as to flow smoothly along the projection direction.

As one skilled in the art will readily appreciate, three may be represented by M as any natural number greater than or equal to two, and a predetermined period of 250 milliseconds may be represented by P milliseconds as any real number greater than or equal to 200. The predetermined period of 250 milliseconds can be understood as one projection period by the projection unit corresponding to the timing signal, and is equal to the pulse duration (H level period) of the timing signal. When one period is equal to another period, it means that one period is within 95%-105% of another period. In some cases, P represents a real number within the range of 250 to 500.

The individual images and/or their collective overall image are shaped to fit the purpose of presenting the intention of the driver of the vehicle 1 to surrounding drivers and pedestrians, and should not be limited to those shown. In the case of FIG. 3, the individual image 5a extends along a predetermined projection direction, and becomes wider as it extends in this direction (i.e., has a substantially triangular shape). The individual images 5b and 5c are curved and extended so as to intersect a predetermined projection direction (that is, they are curved quadrangular shapes). By the combination of these individual images 5a-5c, a whole image of a divided cone shape which is continuously widened along a predetermined projection direction is constructed. Although the same individual image and the whole image may be projected onto the road surface from the projection unit of the right front lamp, different images may be projected onto the road surface. The rear lamp can be provided with a similar projection unit.

To further describe the configuration of the projection unit 4d without intention of limitation, the projection unit 4d may have a condenser lens (first lens) 24, a pattern forming member 25, a light shielding member 27, a projection lens (second lens) 28, and a housing 29 in addition to the above-described light sources 21a-21c (see FIGS. 4 and 5).

The condenser lens (24) has M lens portions (24a-24c) corresponding to M light sources (21a-21c). Each of the lens portions 24a to 24c is configured so as to individually focus the light emitted from the light sources 21a to 21c onto the light transmitting sections 26a, 26b, 26c of the pattern forming member 25. More specifically, the lens unit 24a converges the light emitted from the light source 21a on the light transmitting unit 26a. The lens unit 24b converges the light emitted from the light source 21b to the light transmitting unit 26b. The lens unit 24c converges the light emitted from the light source 21c on the light transmitting unit 26c. Each of section 24a-24c has an incident surface 24a1-24c1 and an exit surface 24a2-24c2, and the incident surface 24a1-24c1 is formed as a flat surface, and the exit surface 24a2-24c2 is formed as a condenser lens surface. The entrance faces 24a1-24c1 may be provided with an optically functional layer such as an anti-reflection film. For convenient attachment to the housing 29, the lens portions 24a to 24c are stacked in a predetermined direction (for example, a vertical direction). Each of the lens portions 24a-24c may be individually manufactured (e.g., by cutting and polishing of glass or by injection molding of resin) and then bonded to each other by an adhesive, but this is not necessarily the case.

The pattern forming member 25 is an optical component in which M light-transmitting sections 26a to 26c corresponding to M light sources 21a to 21c are provided in a light-shielding section 26j. The light transmitting sections 26a-26c are optical apertures, typically hollow holes, but are not limited to non-hollow holes filled with a material that is substantially transparent to the emitted light of the light source. A part of the emitted light from the light sources 21a to 21c is incident on the light transmitting sections 26a to 26c, and the remaining part is not incident on the light transmitting sections 26a to 26c. In this way, the light emitted from the light sources 21a to 21c is converted by the pattern forming member 25 into light rays having a shape corresponding to the outline of the light transmitting sections 26a to 26c. Needless to say, the light-transmitting portion 26a has a contour corresponding to the individual image 5a for projection of the individual image 5a. The light transmitting section 26b has a contour corresponding to the individual image 5b for projecting the individual image 5b. The light transmitting section 26c has a contour corresponding to the individual image 5c for projecting the individual image 5c.

As shown in FIG. 5, the pattern forming member 25 can be formed by laminating a plurality of members such as the first member 25p and the second member 25q. M light-transmitting sections 26a-26c are provided in a flat light-shielding section 26j of a member (second member 25q in FIG. 5) of a pattern forming member 25, and scattering of light on a wall surface defining the contours of the light-transmitting sections 26a-26c is suppressed.

A light shielding member 27 can be provided for optically partitioning the optical channels CH1-CH3 between the light sources 21a-21c and the light transmitting sections 26a-26c, whereby crosstalk between the optical channels CH1-CH3 is suppressed. For example, the first light shielding member 27m is provided for optical partitioning between the optical channel CH1 and the optical channel CH2, and the second light shielding member 27n is provided for optical partitioning between the optical channel CH1 and the optical channel CH2. M−1 light-shielding members 27 may be provided corresponding to the number of M light channels, but the present invention is not necessarily limited thereto. It is also possible to employ a common light-shielding member employed for individually separating all light channels.

The projection lens 28 projects the light transmitted through the transparent portions 26a, 26b, and 26c of the pattern forming member 25 (that is, the light beam emitted from the pattern forming member 25) onto a road surface around the vehicle 1 (for example, the front or the rear). The projection lens 28 is provided in common to a plurality of light-transmitting sections 26a-26c, and miniaturization and cost reduction of the projection unit 4d are promoted.

The condenser lens 24, the pattern forming member 25, and the projection lens 28 are fixed to a common light-shielding housing 29. The housing 29 is constructed by combining the upper housing with the lower housing, whereby the projection unit 4d can be easily assembled. The projection unit 4d may be provided in the vehicle so that the optical axis AX of the projection lens 28 extends obliquely downward forward and obliquely intersects the horizontal direction orthogonal to the vertical direction, but this is not necessarily the case.

In a supplementary explanation from the viewpoint of propagation of light, the emitted light of the light source 21a propagates along the optical axis AX of the projection unit 4d (projection lens 28) via the lens portion 24a of the condenser lens 24, the light transmitting section 26a, and the projection lens 28. The emitted light of the light source 21a is subjected to a lens effect at the exit surface 24a2 of the lens portion 24a, and is focused on the light-transmitting portion 26a. A part (for example, 80%) of the light emitted from the exit surface 24a2 of the lens portion 24a is transmitted through the light-transmitting portion 26a, and the remaining part is absorbed by the light shielding portion 26j or the light shielding member 27. The light emitted from the light source 21b and the light source 21c can be understood in the same manner, and the description thereof will be omitted. The light transmitted through the transparent portions 26a, 26b and 26c is projected onto the road surface around the vehicle 1 via the projection lens 28.

Figure 6:
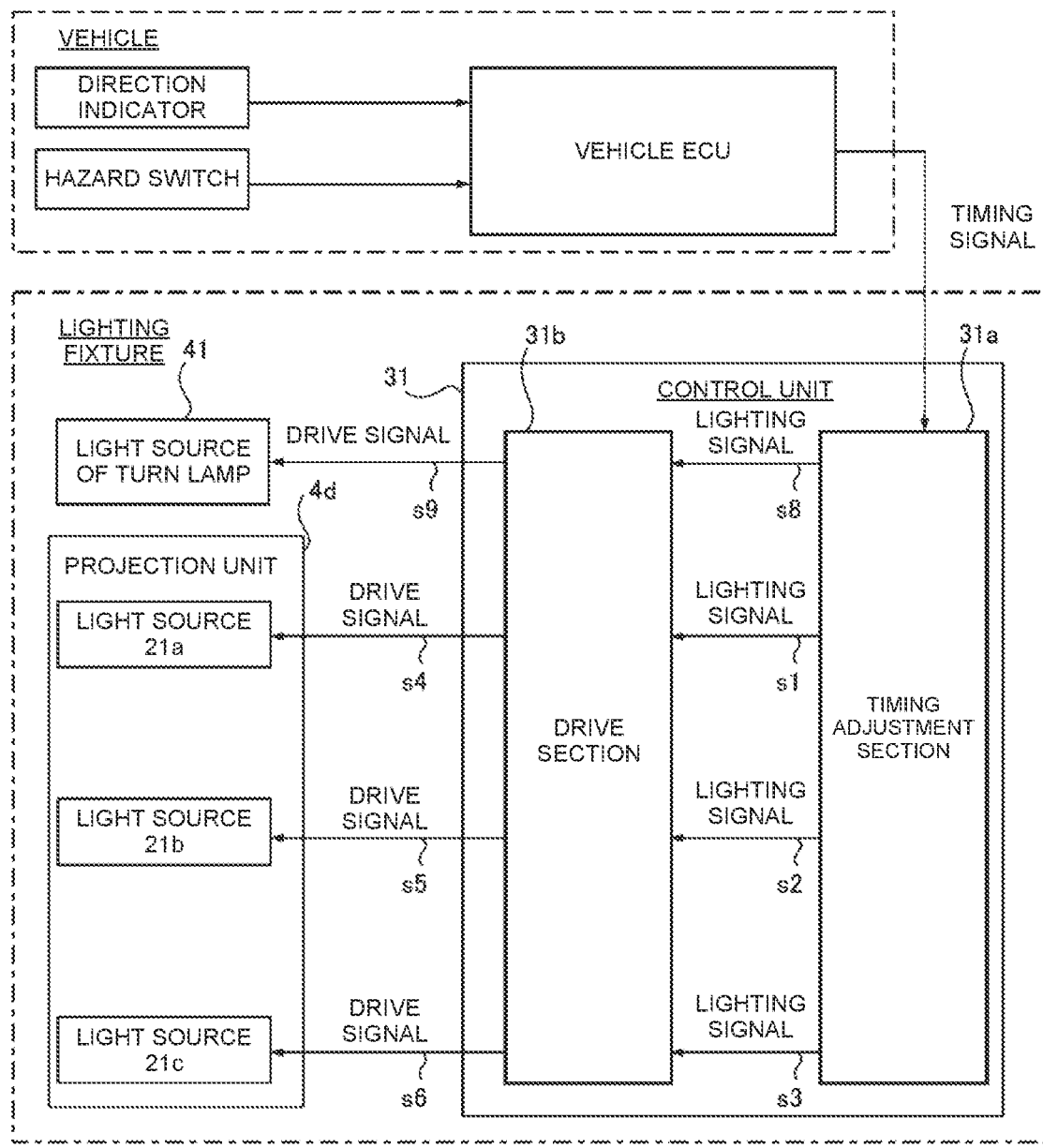
FIG. 6 is a schematic block diagram referred to for explanation of configuration and function of a control unit of a dual-use lamp (projection device for a vehicle).

A further explanation will be given below with reference to FIGS. 6 and 7. In addition, in FIG. 6, the control unit of the lamp serves to control both the light source of the turn lamp and the light source of the projection unit. Since the lighting device according to the present disclosure includes a projection device, the control unit of the lighting device can be understood as the control unit of the projection device.

A control unit 31 is configured to control three light sources 21a-21c according to a timing signal so as to repeat a projection period in which three light sources 21a-21c are controlled for projecting three individual images 5a-5c onto a road surface, and a non-projection period in which all three light sources are turned off. The projection period corresponds to a period in which the pulse of the timing signal is at the H level, and the non-projection period corresponds to a period in which the pulse of the timing signal is at the L level.

A control unit 31 controls three light sources 21a-21c so that, in a projection period (a period of at least P milliseconds (P represents a real number of 200 or more)), the projection of three individual images 5a-5c onto a road surface starts in a predetermined order from the start point of the projection period, all of the three individual images 5a-5c are projected onto the road surface at the middle point of the projection period, and the projection of the three individual images 5a-5c onto the road surface ends at the end point of the projection period. Although the completion of the projection of the three individual images 5a-5c onto the road surface is achieved by simultaneously or substantially simultaneously turning off the three light sources 21a-21c, a slight difference (e.g., imperceptible by a human) may be provided at the time of turning off the three light sources 21a-21c. In some cases, the end of the projection period is equal to the time when all light sources 21a-21c are completely turned off, or the end of the projection period is equal to the time when all light sources 21a-21c are turned off simultaneously.

In this embodiment, the control unit 31 is configured to control three light sources 21a-21c so that the projection of the second projected individual image 5b is started at a second time point after the first time point at which a period of 250/3 milliseconds has elapsed from the projection start time point of the first projected individual image 5a in the three individual images 5a-5c. This makes it easier to obtain a visual effect by projecting sequential individual images than in the case where the projection of the second individual image is started at the first time point. Again, three can be represented by M and N as any natural number greater than or equal to two, and 250 milliseconds can be represented by P milliseconds as any real number greater than or equal to 200 (e.g., a real number greater than or equal to 250 and less than or equal to 500). $(Q/P) \leq 0.8$ can be satisfied when the time interval between the start point of the projection period and the intermediate point of time (that is, the point of time at which the road surface projection of the three individual images 5a-5c has been completed) is Q (Q indicates a real number) milliseconds. In some cases, $0.5 < (Q/P) \leq 0.8$ is satisfied. In this case, it is possible to ensure all necessary and sufficient lighting periods in the projection period.

The controller 31 is suitably configured to control the light sources 21a-21c as described above. For example, the control unit 31 includes an analog circuit, a digital circuit, a mixed analog-digital circuit, and a PLD (Programmable Logic Device), a microcomputer, or an arbitrary combination thereof. In some cases, as shown in FIG. 6, the control section 31 includes a timing adjustment section 31a and a drive section 31b. The timing adjustment unit 31a may be constituted from an analog circuit, a digital circuit, an analog-digital mixed circuit, a PLD (Programmable Logic Device), a microcomputer, or any of these combinations of the above. The drive unit 31b may include an analog circuit, an analog-digital mixed circuit, or the like.

The timing adjustment unit 31a is configured to output lighting signals s1 to s3, s8 (for example, pulse signals for voltage and current) in synchronization with the first change (for example, rise from L level to H level) of timing signals such as a turn signal and a hazard signal in a certain order and simultaneously stop the output of the lighting signals s1-s3, s8n in synchronization with the second change of the timing signal (for example, the falling from the H level to the L level). The timing signals can be used as lighting signals s1 and s8.

The output timing of the lighting signals s1-s3 can be adjusted in various ways. For example, the timing adjustment unit 31a may include a first delay circuit that applies a propagation delay to the timing signal or the lighting signal s1 to generate the lighting signal s2, and a second delay circuit that applies a propagation delay to the lighting signal s2 to generate the lighting signal s3. By appropriately setting the delay time of the delay circuit, it is possible to output the lighting signals s2 and s3 at appropriate timing. As for the lighting signal s1, the timing signal can be used as it is, or it can be newly generated by the timing adjustment unit 31a in response to the input of the timing signal. As the delay circuit, a circuit in which two transistors (for example, FETs) connected in series between a power supply potential and a ground potential are connected in parallel so that a signal can be propagated can be adopted, but this is not necessarily the case.

In another case, the timing adjustment unit (31a) can include a counter circuit that starts counting in synchronization with a first change (for example, a rise from the L level to the H level) of the timing signal and returns the count value to an initial value in synchronization with a second change (for example, a fall from the H level to the L level) of the timing signal, and a signal generation unit that generates lighting signals (s1 to s3) (or lighting signals (s2, s3)) based on a comparison between the count value of the counter circuit and a threshold value. The counter circuit counts output pulses of the oscillation circuit or counts pulses of the reference clock. The signal generation unit compares the count value of the counter circuit with a preset first threshold value, and generates a lighting signal s2 when the count value exceeds the first threshold value. Similarly, the signal generation unit compares the count value of the counter circuit with a predetermined second threshold value (larger than the first threshold value), and generates the lighting signal s3 when the count value exceeds the second threshold value.

When it is desired to light the light source 21a of the projection unit 4d earlier than the light source 41 of the turn lamp, the lighting signal s1 is generated instantaneously from the rise of the timing signal, or the timing signal is used as the lighting signal s1. When the timing signal is used as the lighting signal s1, necessary signal processing such as voltage level adjustment may be performed.

The drive unit 31b generates drive signals s4 to s6 in response to the lighting signals s1 to s3 from the timing adjustment unit 31a and outputs the drive signals s4 to s6 to the light sources 21a to 21c. Similarly, the drive unit 31b generates a drive signal s9 in response to the lighting signal s8 from the timing adjustment unit 31a, and outputs the drive signal s9 to the light source 41 of the turn lamp. The drive signals s4 to s6 and s9 are current signals, for example, and are supplied to the semiconductor light-emitting elements (e.g., LEDs or LDs) of the light sources 21a to 21c and 41. The drive signals s4-s6 and s9 are not necessarily constant, but may have values adjusted in response to PWM control.

Further description will be made with reference to FIG. 7. In this specification, it is assumed that the time delay between the generation time point of the lighting signal and the lighting start time point of the light source is negligible. The time delay between the start of the operation of the light source and the start of the projection of the individual image shall also be negligible. That is, the time delay between the generation time point of the lighting signal and the projection start time point of the individual image is negligible. Accordingly, the luminous intensity of the light sources 21a to 21c shown in FIG. 7 can be understood by replacing it with the level of the lighting signal or the drive signal (for example, H level or L level) or the illuminance of the individual image projected on the road surface.

A timing signal such as a turn signal is input from the direction indicator 72 to the control unit 31 through or without the vehicle ECU 71 by operation of the direction indicator 72 by the driver. The control unit 31 turns on the light source 41 of the turn lamp 4c in synchronization with the input of the timing signal (the rising edge of the timing signal or the H level timing signal), and similarly turns on the light sources 21a, 21b, and 21c of the projection unit 4d in this order in synchronization with the input of the timing signal. The start of lighting of the light sources 21a, 21b and 21c is controlled by the control unit 31 as described above. Although the light source 21a of the projection unit 4d is controlled so as to be turned on earlier than the light source 41 of the turn lamp 4c, this is not necessarily the case.

More specifically, an H-level timing signal is input to the control unit 31 at time t1. In response to this, the timing adjustment unit 31a outputs the lighting signal s1 to the drive unit 31b almost simultaneously with the time t1 (or slightly delayed), the drive unit 31b outputs the drive signal s4 to the light source 21a, the light source 21a is lighted, and the individual image 5a is projected onto the road surface as shown in FIG. 3 a. Similarly, the timing adjustment unit 31a outputs the lighting signal s8 to the drive unit 31b substantially simultaneously with the time t1 (or slightly delayed), and the drive unit 31b outputs the drive signal s9 to the light source 41, so that the light source 41 is lit. It should be noted that the peripheral circuit of the light source 41 and the drive signal s9 can be appropriately configured to sequentially light the turn lamp. Although the lighting start time of the light source 41 and the lighting start time of the light source 21a are the same, the present invention should not be limited thereto. When the light source 21a starts lighting earlier than the light source 41 of the turn lamp, an image is projected on the road surface for a longer period of time than when the turn lamp is lit, so that the possibility that the projected image is visually recognized by surrounding drivers and pedestrians is increased.

The control unit 31 operates to turn on the light source 21a immediately (for example, within 10 milliseconds, within 5 milliseconds, within 2.5 milliseconds, or within 0.5 milliseconds) from the time of input of the H-level timing signal. By turning on the light source 21a at an early stage, the period during which the individual image 5a is independently projected on the road surface can be extended. As a precaution, the lighting signal s1 is generated well before the time t3 (at a time point very close to the time t1 than the time t3). Time t3 represents the elapsed time from time t1 calculated by dividing the projection period (i.e., P milliseconds) during which an image is projected onto the road surface by the number of discrete images 5a-5c (which is also equal to the number of light sources 21a-21c here).

The period during which the first projected individual image 5a is projected alone may be in the range of 35%-60% or 40%-55% of P milliseconds (e.g., P=250) of the projection period. As a result, the single projection period of the individual image 5a becomes relatively long in comparison with the period in which the other individual images 5b and 5c are projected on the individual image 5a in an overlapping manner, and it is easy to obtain a visual effect by sequential projection.

The timing adjustment unit 31a outputs the lighting signal s2 to the drive unit 31b at a time t4 which is a time point after the time t3, the drive unit 31b outputs the drive signal s5 to the light source 21b, the light source 21b is lighted, and as a result, the individual image 5b is projected onto the road surface as shown in FIG. 3 b. In this embodiment, the projection of the second projected individual image 5b is started at a second time point after the first time point at which a period of 250/3 milliseconds has elapsed from the projection start time point of the first projected individual image 5a in the three individual images 5a to 5c. This makes it easier to obtain a visual effect by projecting sequential individual images than in the case where the projection of the second individual image is started at the first time point. Again, three can be represented by M and N as any natural number greater than or equal to two, and 250 milliseconds can be represented by P milliseconds as any real number greater than or equal to 200 (e.g., a real number within the range of 250 to 500).

The lighting signal s2 is generated before time t6 (i.e., between time t3 and time t6), and is preferably generated at time t4 which is closer to time t3 than time t6. Time t6 represents the elapsed time from time t3 calculated by dividing the projection period (i.e., P milliseconds) of the image projected onto the road surface by the number of discrete images 5a-5c (which is also equal to the number of light sources 21a-21c here). When time t6 is calculated as the elapsed time from time t1, it can be calculated by 2×(P/N). When the light source 21b starts lighting with an appropriate delay from the time t3, the period during which the individual image 5a is independently projected becomes relatively long compared to the case in which the light source 21b is not lit, and the visual effect by the sequential projection of the individual image 5a becomes easy to be obtained.

Preferably, time t4 is 5 milliseconds, or 10 milliseconds, or 20 milliseconds, or 30 milliseconds, or 40 milliseconds later from time t3. As an additional condition, time t4 is 70 milliseconds, or 65 milliseconds, or 60 milliseconds, or 55 milliseconds before time t4. It is assumed that an arbitrary numerical range can be determined based on the selection of the numerical values listed in this paragraph. For example, time t4 may be within a range of 5-70 milliseconds from time t3. Thus, a sufficient lighting period of the light source 21b can be ensured. The numerical value or numerical range for time t4 described in this paragraph is particularly advantageous when P=250 to 500 (or P=300±50).

In some cases, time t4 is a point in time within the range of 1.5×(P/(N+1)) milliseconds to 2×(P/(N+1)) milliseconds. For P=250, N=3, time t4 is a time in the range of 1.5×(250/(3+1)) milliseconds to 2×(250/(3+1)) milliseconds, and is a time in the range of 93.75 to 125 milliseconds. If time t4 is 93.75 milliseconds, 37.5% of the time is allocated for the sole projection of discrete image 5a in a projection period of 250 milliseconds. If time t4 is 125 milliseconds, 50% of the time is allocated for the sole projection of discrete image 5a in a projection period of 250 milliseconds.

The timing adjustment unit 31a outputs the lighting signal s3 to the drive unit 31b at time t6.5 (i.e., an intermediate time point of the projection period) which is a time point after the time t6, and the drive unit 31b outputs the drive signal s6 to the light source 21c, and the light source 21c is lighted, and as a result, the individual image 5c is projected on the road surface as shown in FIG. 3 (c). When the light source 21c starts lighting with an appropriate delay from the time t6, the projection period of the two individual images 5a and 5b becomes relatively long as compared with the case where the light source 21c does not start lighting, so that a visual effect can be easily obtained by projecting the sequential individual images.

The lighting signal s3 is generated before (i.e., between time t6 and time t9) time t9 (i.e., at the end of the projection period), and is preferably generated at time t6.5 which is closer to time t6 than time t9. Time t9 represents the elapsed time from time t6 calculated by dividing the projection period (i.e., P milliseconds) of the image projected onto the road surface by the number of discrete images 5a-5c (which is also equal to the number of light sources 21a-21c here). When time t9 is calculated as the elapsed time from time t1, it can be calculated by 3×(P/N). In the case shown in the figure, since N=3, time t9=P milliseconds. That is, the time t9 corresponds to the second change (for example, falling) of the timing signal, and at this point, the light source 41 of the turn lamp and the light sources 21a to 21c of the projection apparatus are all turned off. The period between time t6.5 and time t9 is a total lighting period in which all of the light sources 21a to 21c are lit.

Although the time t6.5 is calculated by dividing the time period between the time t4 and the time t9 by 2, the time t6.5 is not necessarily limited thereto. 6.5 It is also possible to control so that the light sources 21b and 21c are simultaneously turned on at time t4.

Preferably, time t6.5 is 4 milliseconds, or 10 milliseconds, or 20 milliseconds, or 30 milliseconds, or 40 milliseconds, or 45 milliseconds later from time t6. As an additional condition, time t6.5 is 70 milliseconds, 65 milliseconds, 60 milliseconds, 55 milliseconds before time t6. It is assumed that an arbitrary numerical range can be determined based on the selection of the numerical values listed in this paragraph. For example, time t6.5 may be within a range of 5-70 milliseconds from time t6. Thus, a sufficient lighting period of the light source 21c can be ensured. The numerical value or numerical range for time t6.5 described in this paragraph is particularly advantageous when P=250 to 500 (or P=300±50).

Figure 7:
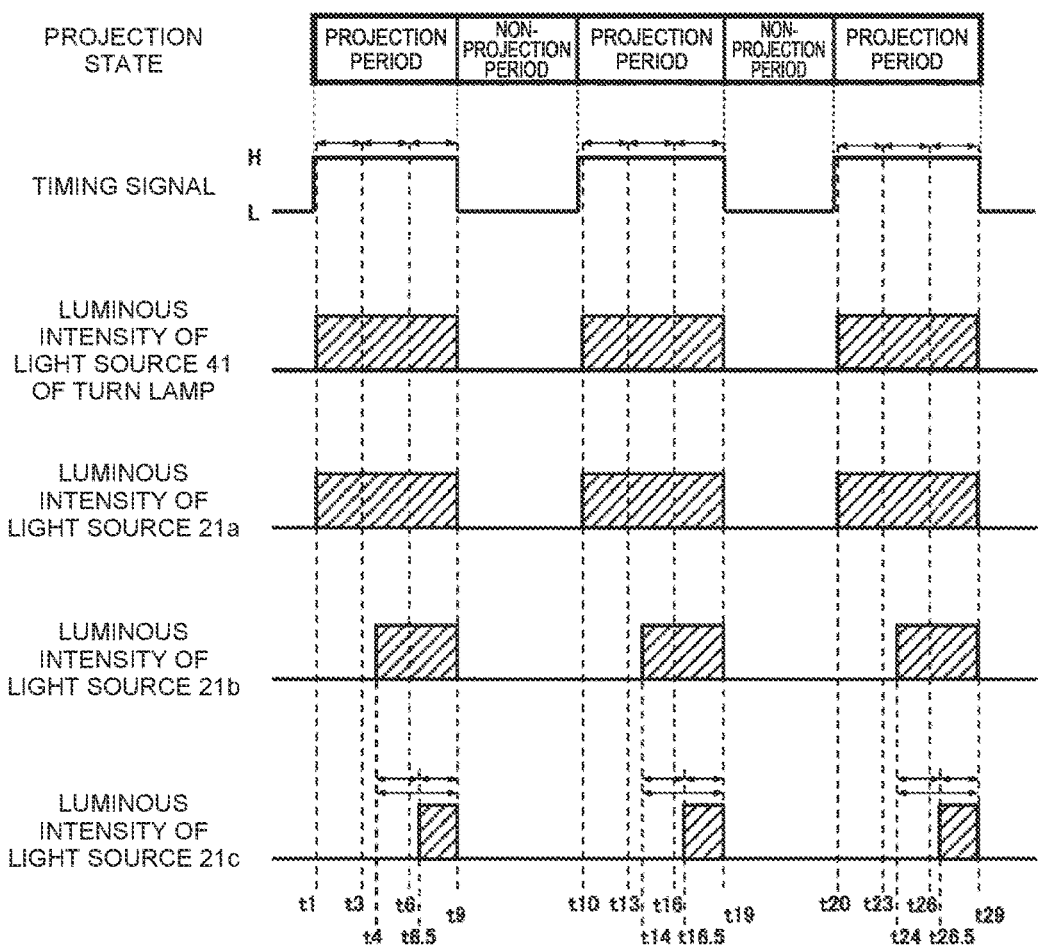
FIG. 7 is a schematic time chart relating to lighting control of each light source of the turn lamp and the projection unit.

The same control as that of the times t1 to t9 is performed for the times t10 to t19 and the times t20 to t29 in FIG. 7. The control unit 31 is configured not to output a lighting signal when the timing signal is at the L level, so that both the light source 41 of the turn lamp and the light sources and the light sources (21a-21c) of the projection unit (4d) are extinguished. It should be noted that the H level period and the L level period of the timing signal are substantially equal, that is, the projection period and the non-projection period are substantially equal in length of time.

Figure 8:
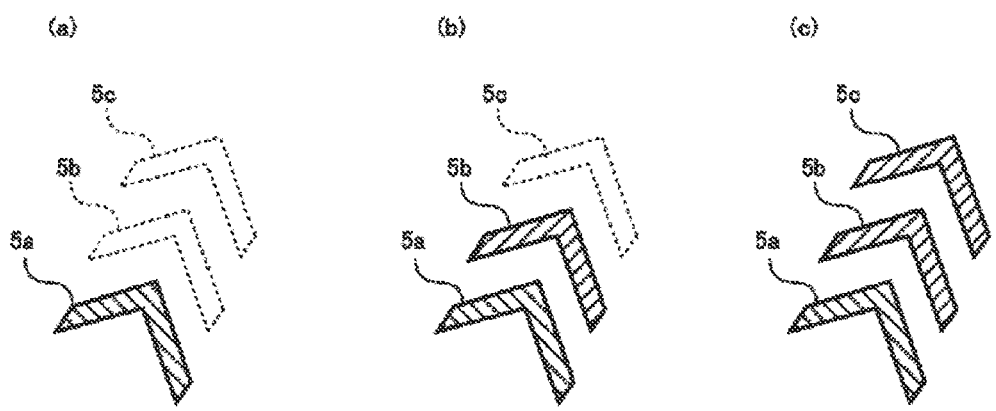
FIG. 8 is a schematic diagram showing a modification example of an individual image, and similar to FIG. 3, a) to (c) as in FIG. 3.

Again, the individual image and/or the aggregate image is shaped to fit the purpose of presenting the intention of the driver of the vehicle 1 to surrounding drivers and pedestrians, and should not be limited to those shown. In the case shown in FIG. 8, the individual images 5*a*-5*c* have a shape which schematically shows the head of an arrow, or in short, an inverted V shape. An overview consisting of a set of individual images 5*a*-5*c* shows a multi-stage inverted V pattern in which the individual images of the inverted V shape are spaced apart. The individual image and the entire image can be changed into various shapes by adjusting the opening shape of the light-transmitting portion of the pattern forming member 25.

Of the individual images 5*a*-5*c*, the individual images 5*b* and 5*c* may be projected simultaneously (see FIGS. 9 and 10). Since the projection start times are the same, two individual images 5*b* and 5*c* are grasped as one individual image. The projection of the individual images 5*b* and 5*c* starts at time t5 after time t4.5 which is delayed by P/2 from time t1 which is the projection start time of the individual image 5*a*. As compared with the case where the projection of the individual images 5*b* and 5*c* starts at time t4.5, the single projection time of the individual image 5*a* is ensured to be relatively long, so that the visual effect by the projection of the sequential individual images can be easily obtained. Preferably, but not necessarily, the starting point of projection of the three individual images onto the road surface is different for all three individual images.

FIG. 11 shows a configuration in which the drive signals s4, s5 and s6 are PWM-controlled so that the luminous intensities of the light sources 21*a*, 21*b* and 21*c* gradually increase. It is also possible and within the scope of the invention of this disclosure to control the luminosity of the light source in this manner.

Various design variations with respect to the various forms or features described above are possible and within the scope of this disclosure.

EXPLANATION OF REFERENCE NUMERALS

4*d*: Projection part
5*a*: Individual image
5*b*: Individual image
5*c*: Individual image
21: Light source
21*a*: Light source
21*b*: Light source
21*c*: Light source
24: Condensing lens
25: Pattern forming member
27: Light shielding member
31: Control unit
31*a*: Timing adjustment unit
31*b*: Drive unit

The invention claimed is:

1. A projection apparatus for a vehicle comprising,
a projection unit having at least M light sources (where M represents a natural number greater than or equal to 2) and for projecting at least N individual images (N represents a natural number of 2 or more) onto a road surface along a predetermined direction based on the lighting of the light sources; and
a control unit for controlling the at least M light sources so that, in a predetermined period of at least P milliseconds (where P represents a real number of 200 or more), the projection of the at least N individual images onto the road surface starts in a predetermined order from a start point of the predetermined period, all of the at least N individual images are projected onto the road surface at an intermediate point of the predetermined period, and the projection of the at least N individual images onto the road surface ends at an end point of the predetermined period, wherein:
the control unit is configured to control the at least M light sources so that the projection of the second projected image in the at least N individual images is started at a second time point after a first time point in which a period of P/N milliseconds has elapsed from a projection start time point of the first projected image in the at least N individual images.

2. The projection apparatus for a vehicle according to claim 1 wherein the N is a natural number of 3 or 4 or 5, and the P represents a real number within the range of 250 to 500.

3. The projection apparatus for a vehicle according to claim 1, wherein a period during which the first projected image is independently projected is within a range of 35% to 60% of the P milliseconds.

4. The projection apparatus for a vehicle according to claim 1 wherein the second time point is closer to the first time point than a third time point at which a period of 2×(P/N) milliseconds has elapsed from the first time point.

5. The projection apparatus for a vehicle according to claim 1 wherein the second time point is a time point within a range of 5 to 70 milliseconds from the first time point.

6. The projection apparatus for a vehicle according to claim 1 wherein the second time point is a time point within a range of 1.5×(P/(N+1)) milliseconds to 2×(P/(N+1)) milliseconds.

7. The projection apparatus for a vehicle according to claim 1 wherein (Q/P)≤0.8 is satisfied when a time interval from a start time point of the predetermined period to the intermediate time point is Q (Q is a real number) milliseconds.

8. The projection apparatus for a vehicle according to claim 1 wherein the natural number represented by M is equal to the natural number represented by N, and a projection start time point of the N individual images onto the road surface is different for all the N individual images.

9. The projection apparatus for a vehicle according to claim 1, wherein the predetermined direction is a direction separating forward or backward from the vehicle.

10. The projection apparatus for a vehicle according to claim 1 wherein the control unit is configured to control the at least M light sources so as to repeat a projection period in which the at least M light sources are controlled for projecting the at least N individual images onto the road surface and a non-projection period in which all of the at least M light sources are turned off in response to a timing signal transmitted from the vehicle body, and wherein the predetermined period is equal to the projection period.

11. The projection apparatus for a vehicle according to claim 10 wherein the projection period and the non-projection period are equal in length of time.

12. The projection apparatus for a vehicle according to claim 1 wherein the projection unit comprises a first lens having at least M lens portions corresponding to the at least M light sources, a second lens for projecting the emitted light of the at least M light sources, and a pattern forming member provided between the first lens and the second lens and having at least M light transmitting sections corresponding to the at least M light sources in a light-shielding portion.

13. The projection apparatus for a vehicle according to claim 12, wherein the projection unit further comprises at least one light shielding member provided so as to optically partition an optical channel between said first lens and said pattern forming member.

14. A vehicular lamp comprising the vehicular projection device according to claim 1.

15. A method of operating a projection device for a vehicle provided with a projection unit having at least M (where M represents a natural number of 2 or more) light sources, the method comprising:
projecting at least N (where N represents a natural number of 2 or more) individual images onto a road surface in a predetermined direction based on the lighting of the at least M light sources; and
controlling the at least M light sources so that, during a predetermined period of at least P (where P represents a real number of 200 or more) milliseconds, the projection of the at least N individual images onto the road surface is started in a predetermined order from the start point of the predetermined period, all of the at least N individual images are projected onto the road surface at an intermediate point of the predetermined period, and the projection of the at least N individual images onto the road surface is completed at the end point of the predetermined period, wherein the projection of the first projected image in the at least N individual images is started, and the projection of the second projected image in the at least N individual images is started at a second point of time after a first point of time in which a period of P/N milliseconds has elapsed from the projection start point of the first image is completed.

\* \* \* \* \*